United States Patent [19]
Pulver

[11] 3,935,897
[45] Feb. 3, 1976

[54] METHOD OF SOLAR HEATING AND COOLING

[76] Inventor: Donald W. Pulver, One Oliver Plaza, Pittsburgh, Pa. 15222

[22] Filed: Mar. 21, 1974

[21] Appl. No.: 453,239

[52] U.S. Cl. .................... 165/1; 62/2; 126/270; 126/400; 165/49; 237/1 A
[51] Int. Cl.² ........................................ F28F 21/00
[58] Field of Search ............ 237/1 A; 126/400, 270, 126/271; 165/49, 1, 2; 62/2

[56] References Cited
UNITED STATES PATENTS

| | | | |
|---|---|---|---|
| 1,683,434 | 9/1925 | Altenkirch | 237/1 A |
| 2,030,350 | 2/1936 | Bremser | 62/2 |
| 2,342,211 | 2/1944 | Newton | 62/2 |
| 2,396,338 | 3/1946 | Newton | 62/2 |
| 2,559,869 | 7/1951 | Gay | 237/1 A |
| 2,575,478 | 11/1951 | Wilson | 237/1 A |
| 2,584,573 | 2/1952 | Gay | 62/2 |
| 2,680,565 | 6/1954 | Lof | 62/2 |
| 2,933,885 | 4/1960 | Benedek | 165/180 |
| 3,450,192 | 6/1969 | Hay | 165/49 |
| 3,563,305 | 2/1971 | Hay | 165/2 |

OTHER PUBLICATIONS

A.S.H.R.A.E. Handbook of Fundamentals, 1972, chapter 22.

*Primary Examiner*—Albert W. Davis, Jr.
*Assistant Examiner*—Daniel J. O'Connor
*Attorney, Agent, or Firm*—David H. Semmes

[57] ABSTRACT

Method of solar heating and cooling in a building of the type having insulated opaque and vision glass areas, including orienting the vision glass so as to avoid solar exposure, while shading said vision glass with a series of heat collecting panels and circulating fluid in adsorbent communication with said collectors for use in winter heating and summer cooling systems. The method is distinguished both in its orienting of shading, according to latitude, as well as blocking or cutting off of circulating fluid from said collectors, except under conditions of solar exposure.

15 Claims, 11 Drawing Figures

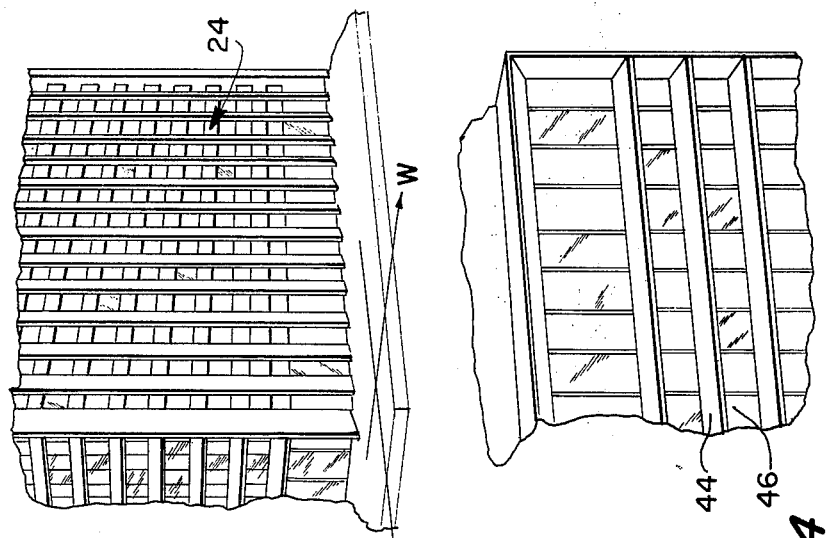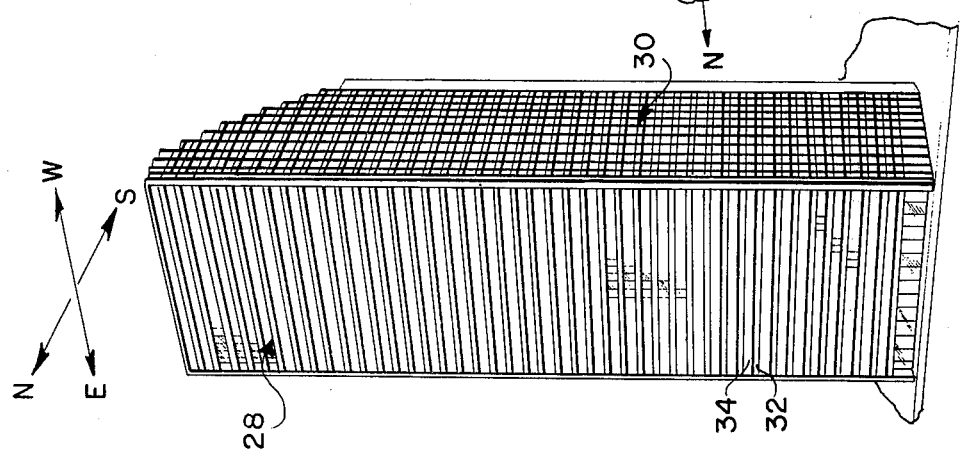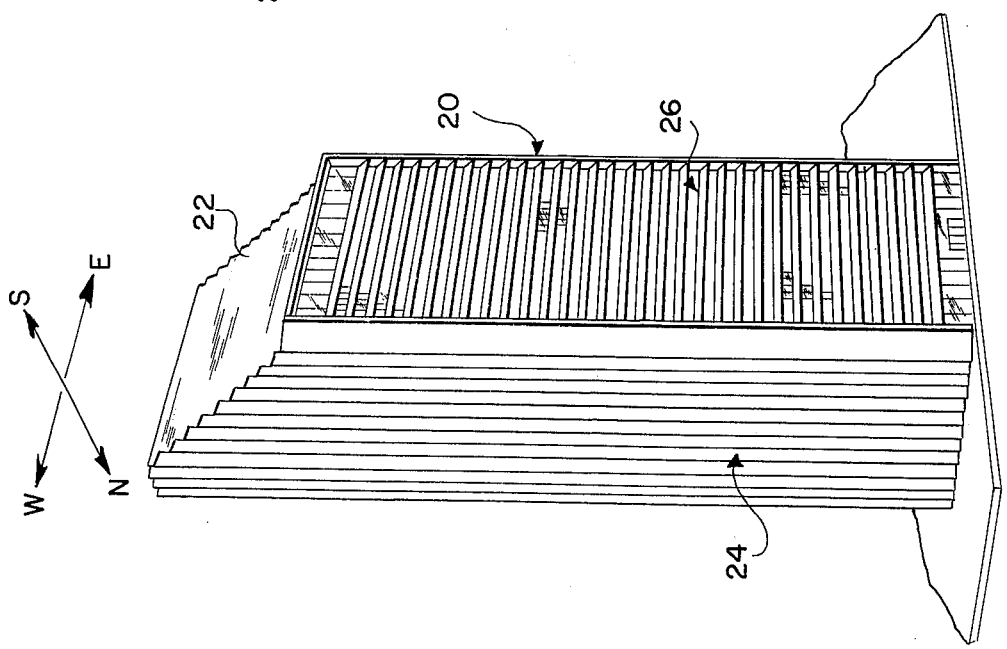

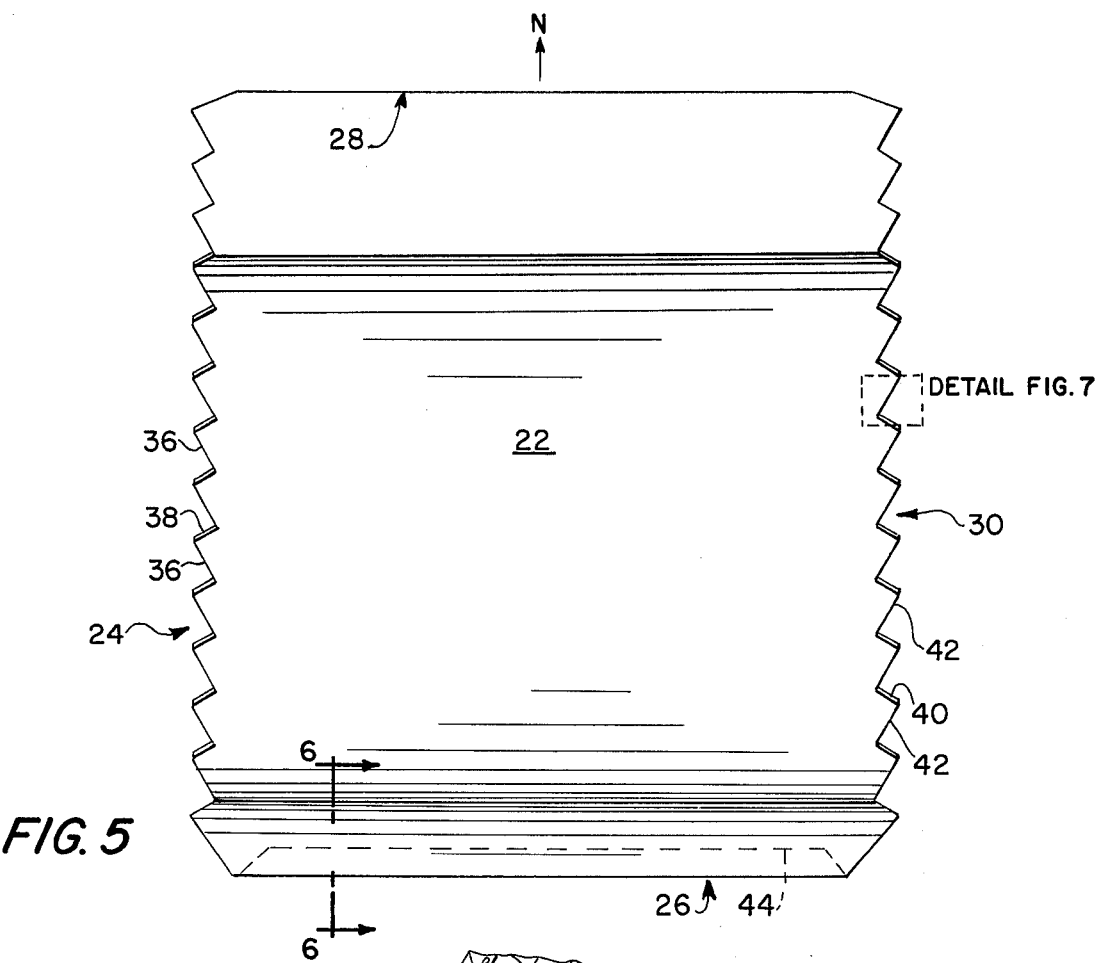
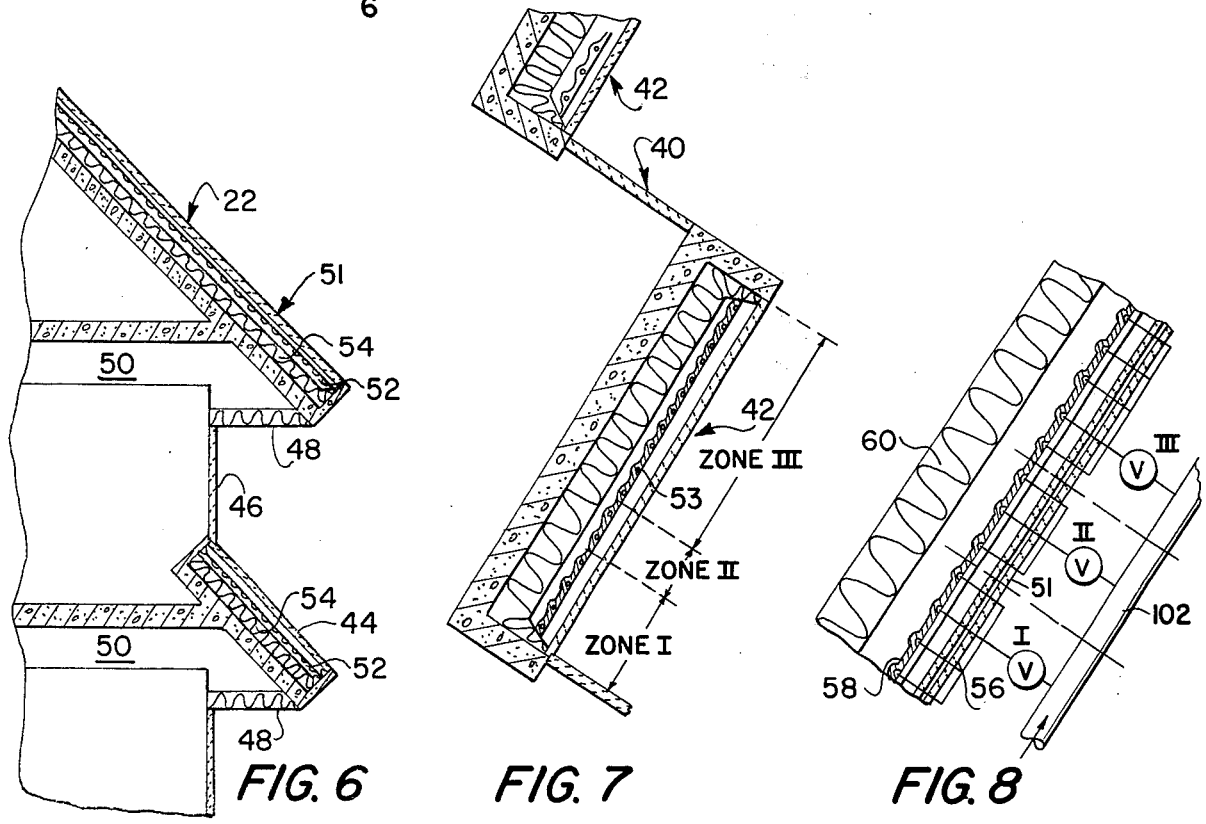
FIG. 5  FIG. 6  FIG. 7  FIG. 8

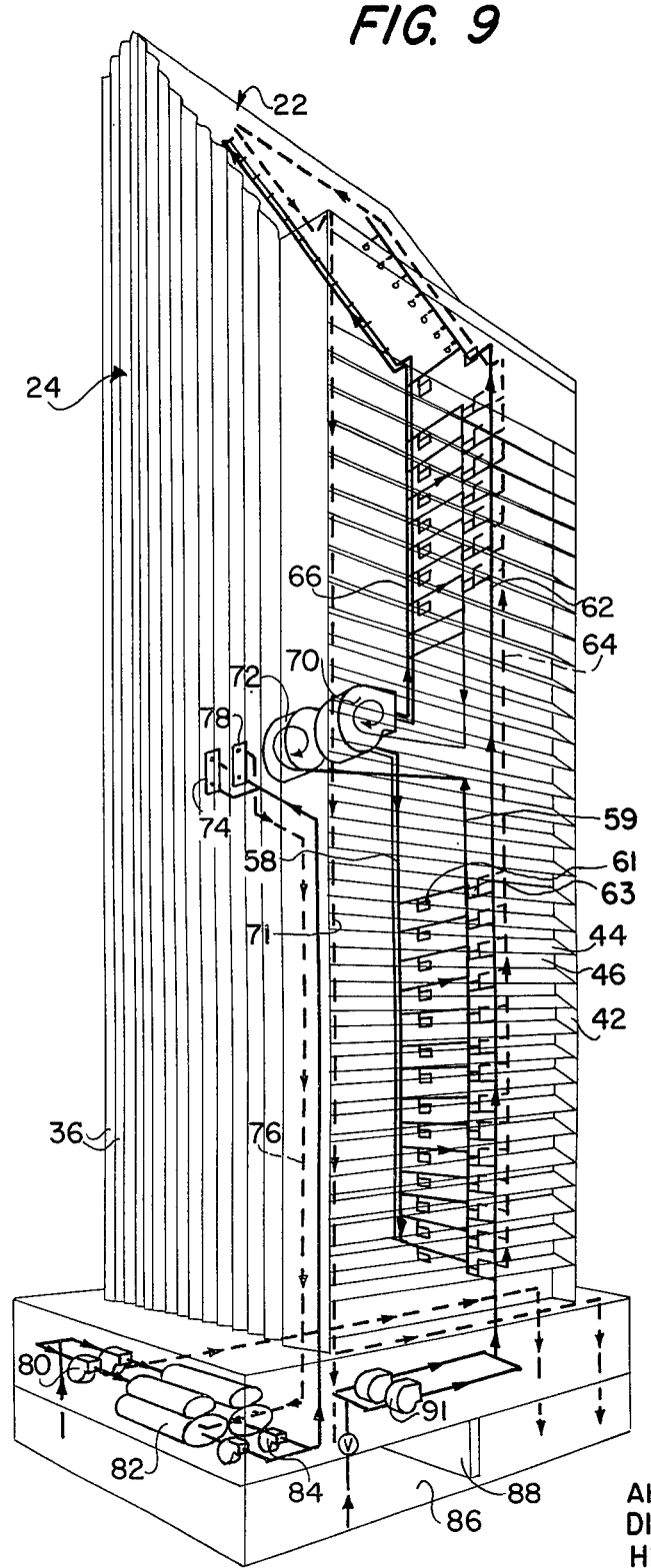

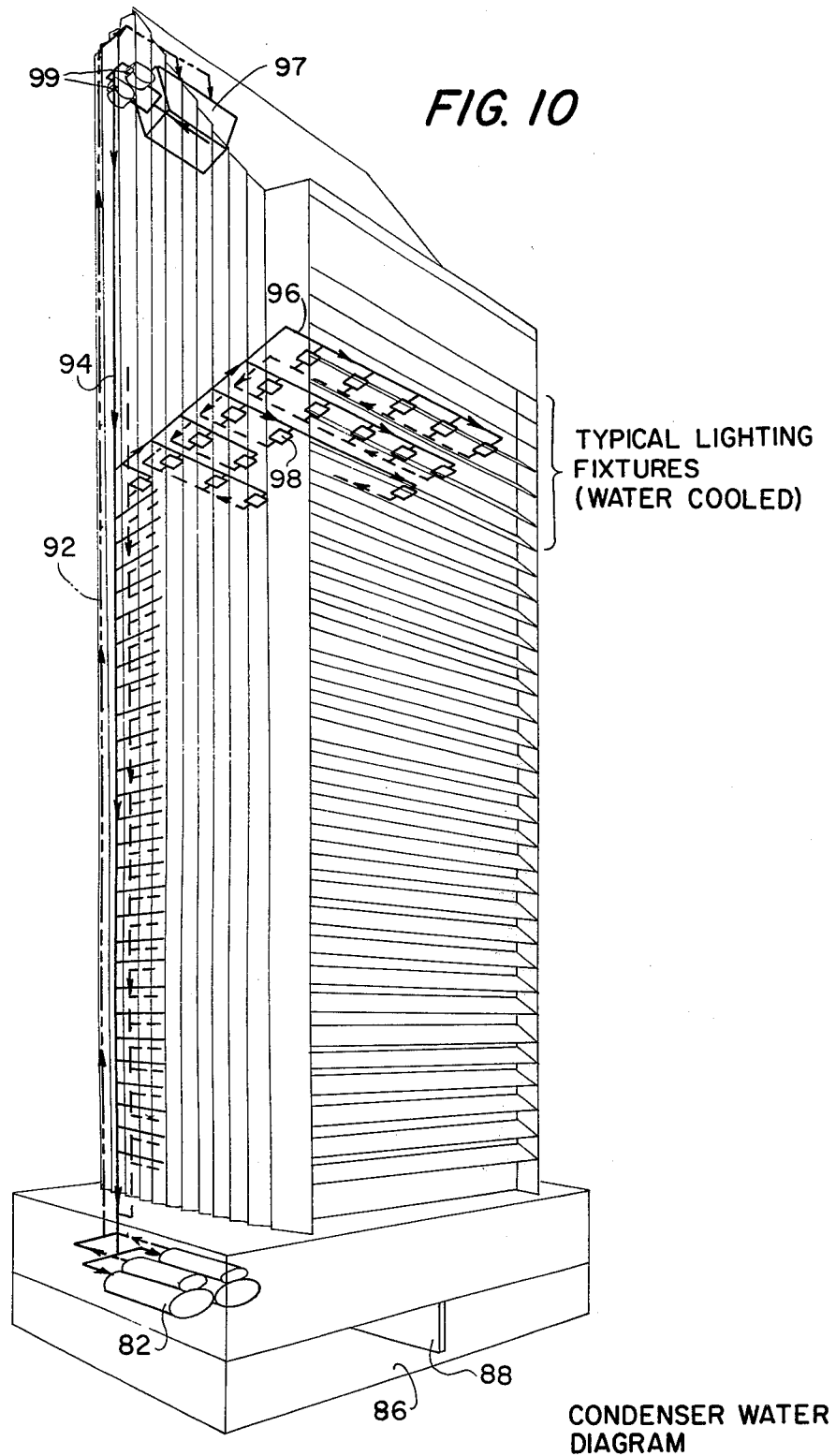

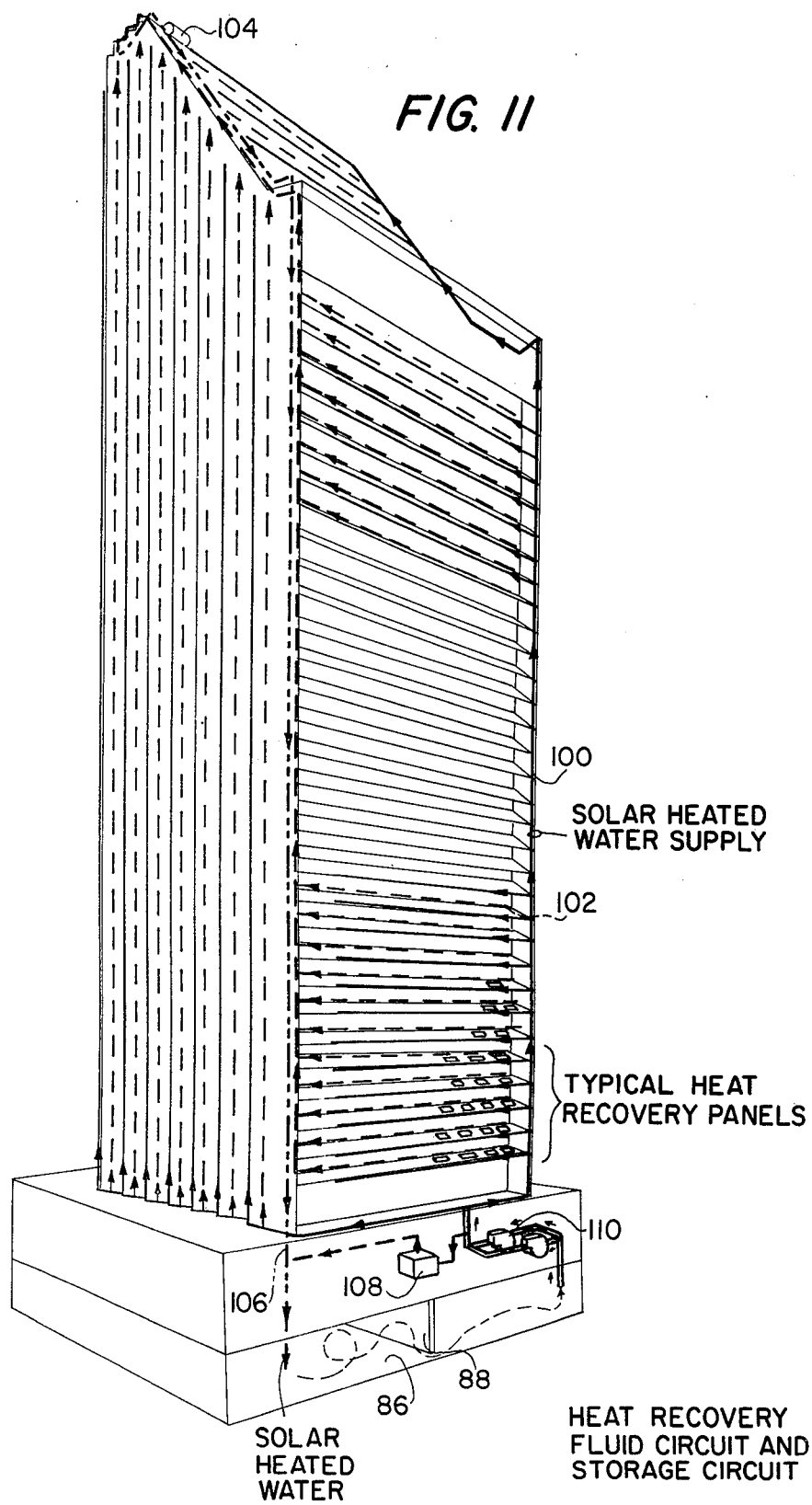

METHOD OF SOLAR HEATING AND COOLING

BACKGROUND OF THE INVENTION

1. Field of the Invention

Solar heating, particularly methods for collecting solar energy for heating an office building during the winter and cooling during the summer. Buildings have been designed to maximize shielding of vision areas from the sun's rays, while utilizing a series of collecting panels, exposed to the sun's rays to transfer solar energy to heating and cooling systems.

2. Description of the Prior Art

The prior art includes U.S. Pat. Nos.:

| | |
|---|---|
| BREMSER | 2,030,350 |
| NEWTON | 2,396,338 |
| NEWTON | 2,342,211 |
| GAY | 2,584,573 |
| LOF | 2,680,565 |
| BENEDEK | 2,933,885 |
| HAY | 3,450,192 |
| HAY | 3,563,305 |

The Newton U.S. Pat. Nos. 2,342,211 and 2,396,338 disclose systems utilizing a radiation unit to transfer heat for desired heating and cooling purposes. Independent heat and cold storing means are heated and cooled by a single radiation device. Gay suggests storing heat in the earth or ground beneath a building for subsequent usage. Lof provides a solar heat trap containing a plurality of zones or passages within which a fluid is circulated to adsorb heat for subsequent transfer, and means are provided for limiting heat radiation within the confined zones and for storing excess heat released through the zones. Bremser discloses a solar operated refrigerating system illustrating a conventional absorption cycle type of cooling system, which itself is a per se known manner of effecting refrigeration from solar energy. Such a conventional absorption cycle may also be advantageously used within the teachings of the instant invention, along with any other known refrigeration cycle of the prior art. The Hay patents show a system wherein exterior insulation is moved over different liquid areas for the purpose of storing or rejecting solar energy. The Benedek patent discloses a heat storage accumulator system and equipment for operating the same.

SUMMARY OF THE INVENTION

Heat loss through the exterior walls is minimized by using maximum insulation in the opaque area and double glazing vision areas. Radiant energy is collected by means of a series of heat collectors prominently displayed on the east, west and southern facades of the building. Chilling loss during the summer months is minimized by orienting the vision glasses on the north side facade, northeasterly on the east facade and northwesterly on the west facade. On the south facade the vision glasses may be shaded by superposed heat collecting panels. A heat responsive fluid is circulated in radiant contact with the heat collector panels and thence to the desired heating and cooling systems. The circulating fluid is blocked sequentially in those areas where the adjacent panels are not exposed to the sun. The heat may be used to operate a low temperature absorption or other conventional type of refrigeration system, as well as a building heater. Forced air may also be preheated by means of the heated circulating fluid which may be stored wihin the building basement.

As a consequence, the system is a net exporter of heat throughout the year.

BRIEF DESCRIPTION OF THE DRAWINGS

FIG. 1 is a perspective view of a proposed building, showing the southern and western facades with shading collecting panels exposed to the sun;

FIG. 2 is a perspective of the north and west facades, showing the vision glass oriented respectively north and northwesterly, the north facade being without heat collecting panels;

FIG. 3 is a fragmentary enlarged view of the west facade, showing angular orientation of the heating panels and north-northwesterly orientation of the double glazed vision areas;

FIG. 4 is an enlarged rear elevation, showing the south facade and adjacent west facade with opaque solar energy collecting panels used complementally as shading for the vision areas;

FIG. 5 is a top plan showing the northwesterly and northeasterly orientation of the west and east vision areas;

FIG. 6 is a fragmentary section taken along section line 6—6 of the south facade and showing the opaque roof-top heat collector, as well as lower collectors superposed at a 45° angle as a shield or shade for the vision areas;

FIG. 7 is a fragmentary vertical section, taken along section line 7—7 of FIG. 5 and showing angular orientation of the heat collecting panels on the east facade, as well as the northeasterly orientation of the vision glass;

FIG. 8 is an enlarged transverse section taken along section line 8—8 of FIG. 7 and showing the positioning of the double vision glass, the collector plate and circulating liquid channels, as well as back-up insulation.

FIG. 9 is a schematic view of suggested building air and piping system;

FIG. 10 is a schematic view of suggested building condensor water system;

and FIG. 11 is a schematic view of a suggested building heat recovery and storage system.

DESCRIPTION OF PREFERRED EMBODIMENTS

In FIG. 1 a multi-story office building generally designated as 20 is illustrated as having inclined southern rooftop opaque collecting area 26, southern facade 25 and western facade 24. In FIG. 2 the building northern facade 28 is illustrated as having conventional double pane vision areas 34 and opaque insulated panels 32.

In FIG. 4 the southern facade is further illustrated as having double pane horizontal vision areas 46 shaded by angularly superposed disposed opaque collector panels 44.

FIG. 5 the building layout is generally illustrated. West facade 24 has its vision areas 38, north-northwesterly disposed with adjacent opaque collector panels 36 exposed to the prevailing sun.

Similarly in the eastern facade 30 the vision areas 40 are north-northeasterly oriented intermediate opaque, angularly disposed or staggered collector panels 42. In the south facade vision areas 46 are shaded by horizontally disposed opaque collector panels 44. Manifestly, the angle of the windows on east and west facades, as well as the angle of the collector panels may be varied, according to the sun'latitude. Similarly, the angle of the shading collector panels 44 may be varied so as to prevent the winter sun exposure to the vision area.

FIG. 6 the rooftop collector panel 22 is illustrated fragmentarily and superposed with respect to collector panels 44 which shade the respective vision areas 46. The rooftop and east-west collector panels may be constructed similarly to include a clear and insulated clear glass cover 51, a collector plate 52, with integral liquid channels 53 and a back-up insulation member 60. Insulation 48 may be interposed intermediate the bottom of the collector panel and the building wall, so as to enclose a circulating plenum or duct 50.

In FIG. 8 the east-west facade collector panel is illustrated in enlarged detail. The collector plate may have a selective surface coating and may be a flat metal plate clad with formed metal plate. Alternatively, the collector panel may include a flat metal plate with welded attached tubes or other combination.

In FIG. 7 the collector panels on the east facade are disposed at a 30° angle; however, this angle may be varied, according to latitude. The individual panels may have disconnect zones I, II, III or the like which may be circuited to cut out of the system when shaded from the sun.

In FIG. 9 the air and piping diagram is illustrated, as including individual air supply boxes 61 and 63, respectively representing a variable volume interior room air supplies as well as exterior room air supplies that are also illustrated for heat exchange as interposed between the low rise supply air conduit 58 and the reheat water supply 62 conduit and return 64. As illustrated in FIG. 9 air in the low rise supply conduit 58, for example, is directed into interior supply 61 and also into the exterior room supply 63 with reheat exchange to reheat water from reheat coil pump 91. This air is schematically illustrated to return to the low rise air supply 72 through air return 59. As shown, the reheat water from 63 is returned through 64 upwardly past all such reheat boxes 63 and finally returned by reheat water reverse line 71 to hot water storage tank 86. A high rise air supply unit 70 and a low rise air supply unit 72 may be employed adjacent the reheat water reverse return conduit 71.

As illustrated in FIGS. 9 and 10, chilled water cooling coils 74 and 78 may be positioned above chilled water supply and return conduit 76 communicating respectively with the storage tank 86 and chilled water pumps 84 chillers 82 and hot water pumps 80. Reheat coil pumps 91 may be positioned, so as to have access to storage tank 86 and the reheat water supply and return conduit 62, 64. Manifestly, a series of valves may be employed to block off circulation in vertical segments, of those panels on the southern facade, as well as lateral and vertical segments of those panels on the eastern and western facades. These valves to selectively control heat recovery by admitting the solar heated water supply, for example to certain liquid channels 53 in zones I, II, and III of FIG. 7 are schematically illustrated as VI, VII and VIII.

In FIG. 10 a condensor water diagram is further illustrated as comprising chillers 82, condenser water supply 94 and condensor water reverse return 92 communicant with condensor water pumps and an optional cooling tower 97 with associated condenser water pumps 99 positioned in the building roof. Typical lighting fixtures 98 are illustrated as cooled by conduit 96 leading from the condensor water supply. As illustrated in FIGS. 9 and 10 taken together, the representation of "chiller" 82 is firstly schematic of a heat pump system wherein hot water pumps 80 supply an energy source to effect chilling of the chilled water return from 76. As hereinabove disclosed, any other type of thermodynamic heat removal may be used to supply chilled fluid to interior cooling coils 78. The cooling circuit from 84 together with the heated liquid at 80 also schematically illustrate interconnections such as are conventional in solar operated absorption refrigeration systems. In this respect the U.S. Pat. to Bremser, No. 2,030,350, herinabove incorporated, represents a conventional solar operated absorption circuit which may be the operative fluid circuit 76 between a heat source at 80 and the cooling or evaporator coil at 78.

In FIG. 11 a heat recoverage and storage system is illustrated as including storage tank 86 having median baffle 88, heat recovery pumps 110 and auxilliary stand by heater 108, communicating with solar heating water return 106. The heat recovery pumps communicate with solar heating water supply 100, as well as solar heating water reverse return 102. An expansion tank 104 may be positioned at the building rooftop.

In a typical 35 story office building, a controlled interior climate may be achieved by the following:
1. Minimization of heating and air conditioning requirements by respectively minimizing heat loss in winter through the exterior wall by means of maximum insulation in opaque areas, double glazing in vision areas, and by minimizing solar heat gain in the summer by orienting vision glass to the north on the north facade, north-northwest on the west side, and completely shading vision glass on the south side by means of angled solar collectors and;
2. Collection of all solar energy striking the building facade and roof by means of double or triple glazed clear glass covered collectors made of coated copper or aluminum plates, with integral or attached fluid carrying channels, connected to pipes, containing a liquid (e.g., water or water and ethylene glycol) which is heated to optimum temperature, returned to a central location at the base of the building, then redistributed through the building where needed for heating in the winter, and used to operate an absorption cycle or other such known system operable upon heat exchange with a heated fluid, amply illustrated by the prior art for a refrigeration equipment in the summer. An insulated storage tank in the basement stores excess hot liquid for night time cooling or heating, any excess hot liquid can be sold to neighboring buildings;
3. The integration of the above two principles results in a novel design which, with the exception of energy for lighting, can be a net exporter of energy, meaning that the excess of solar energy collected on sunny and mildly overcast days vs. that needed for heating and cooling the subject building can be exported in a quantity greater than that needed to be imported (gas, oil, steam or electric backup) on a day or days when solar energy is not available in adequate quantities to heat or cool subject building.

As shown in FIGS. 9 and 10, the particular chillers 82 and 90, respectively, for air conditioning or cooling purposes may be a conventional low temperature (200° to 245°F) "water fired" unit such as that manufactured by Arkla-Servel and designated WF-1200.

I claim:

1. Method of solar heating and cooling in a building of the type having approximate north, east, west and south facades including insulated opaque areas and vision areas comprising:
   A. orienting said vision areas, as follows:
      i. north facade-north
      ii. east facade-northeasterly
      iii. west facade-northwesterly
      iv. south facade-southerly;
   B. shading said south facade vision area during summer months,
   C. orienting heat collectors on said opaque areas as follows: east-southeasterly, west-southwesterly, south-southerly;
   D. circulating heating and cooling fluid, so as to absorb heat of solar radiation from said collectors for purposes of winter heating and summer cooling, while
   E. sequentially blocking circulating of said fluid in areas not exposed to the sun.

2. Method of solar heating and cooling as in claim 1, wherein said summer cooling system is the absorption type.

3. Method of solar heating and cooling as in claim 1, wherein said summer cooling system is a refrigeration type.

4. Method of solar heating and cooling as in claim 1, wherein said fluid is an adsorbing liquid and including storing hot liquid within said building for nighttime use.

5. Method of solar heating and cooling as in claim 4, including exporting from said building excess heat collected on sunny and mildly overcast days.

6. Method of solar heating and cooling as in claim 5, including importing heat on overcast days when solar energy is not available in adequate quantities to heat said circulating fluid.

7. Method of solar heating and cooling as in claim 2, including suspending said heat collectors as shading for said vision areas in east, west and south facades.

8. Method of solar heating and cooling as in claim 7, wherein said heat collectors are horizontally superposed with respect to those south vision areas being shaded.

9. Method of solar heating and cooling as in claim 7, including orienting the opaque areas on the east and west of said building as a function of latitude and the sun's movement so as to maximize solar exposure.

10. Method of solar heating and cooling as in claim 8, wherein said heat collectors in east and west facades are vertically aligned and staggered with respect to said vision areas.

11. Method of solar heating and cooling as in claim 9, including varying orienting of said vision glass in the east and west facades, according to latitude, so as to maximize shading during hours of solar exposure.

12. Method of solar heating and cooling as in claim 7, wherein the angle of said shading is varied according to latitude.

13. Method of solar heating and cooling as in claim 4, including chilling said circulating fluid in a cooling system circulated within said building.

14. Method of solar heating and cooling as in claim 13, including tempering building electric light fixture heat by circulating chilled liquid adjacent lighting fixtures within said building.

15. Method of solar heating and cooling as in claim 1, including blocking lateral and vertical segments of said circulating fluid, so as to regulate building temperature according to building activity, as well as solar exposure.

* * * * *